(12) United States Patent
Pryne

(10) Patent No.: US 6,619,326 B1
(45) Date of Patent: Sep. 16, 2003

(54) POLYVINYL ALCOHOL PLUG FOR PLUMBING APPLICATIONS

(75) Inventor: Scott H. Pryne, Cornwall, NY (US)

(73) Assignee: American Felt & Filter Company, New Windsor, NY (US)

( * ) Notice: Subject to any disclaimer, the term of this patent is extended or adjusted under 35 U.S.C. 154(b) by 0 days.

(21) Appl. No.: 10/353,415

(22) Filed: Jan. 29, 2003

(51) Int. Cl.⁷ ................................................. F16L 55/10
(52) U.S. Cl. ........................................... 138/89; 138/97
(58) Field of Search .............................. 138/89, 97, 90, 138/91

(56) References Cited

U.S. PATENT DOCUMENTS

| | | | |
|---|---|---|---|
| 3,338,499 A | * | 8/1967 | Gilbert ......................... 228/57 |
| 4,357,960 A | | 11/1982 | Han ............................. 138/97 |
| 4,739,799 A | | 4/1988 | Carney et al. ................. 138/89 |
| 5,186,214 A | * | 2/1993 | Savard ......................... 138/89 |
| 5,246,770 A | * | 9/1993 | Bottiglione et al. ........ 442/263 |
| 5,318,075 A | | 6/1994 | Roll ............................. 138/89 |
| 6,627,001 | | 7/2001 | Duncan ....................... 73/49.8 |

* cited by examiner

Primary Examiner—Patrick Brinson
(74) Attorney, Agent, or Firm—Grossman, Tucker, Perreault & Pfleger, PLLC

(57) ABSTRACT

A temporary plug for stemming the flow of water in a water system during the repair of a pipe. The plug is constructed of a water soluble fiber, preferably poly(vinyl alcohol) polymer fiber. The polyvinyl alcohol fiber is preferable carded and needle punched into a fibrous sheet material. Plugs of a predetermined size are then cut from the fibrous sheet material.

18 Claims, 1 Drawing Sheet

POLYVINYL ALCOHOL PLUG FOR PLUMBING APPLICATIONS

FIELD OF THE INVENTION

The present invention relates generally to plumbing repair, and more particularly to a plug for temporarily stemming the passage of water in a pipe while a repair is being carried out.

BACKGROUND OF THE INVENTION

Repair or modification of water system lines typically involves cutting a pipe to remove a portion of the pipe containing a defect and then splicing in a fitting, such as a coupling or joint, over the two exposed ends of the pipe. Typically, water supply and drainage system pipe is constructed of either copper or plastic, such as PVC. When working with copper pipe, brazing, or soldering, is the preferred method for adding in a fitting. Brazing copper pipe usually requires first cleaning and drying the end of the copper pipe and the fitting. Flux may then be applied to the pipe and/or the fitting, which are then assembled. The actual joint is made by heating both the pipe and the fitting and sweating solder into the joint to produce a water tight seal.

Repair of PVC, or other plastic pipe follows a similar scheme. The pipe is first cut to remove the defect, and then a new segment of pipe is spliced in. As with copper pipe, the ends of PVC must first be cleaned and dried. The actual joint is formed using an adhesive between the PVC pipe and the fitting.

Repair of either common variety pipe requires that the pipe and fitting be clean and dry. Even small amounts of water at the joint site may compromise the seal and result in the failure of the joint. Unfortunately, even with the water supply to the pipe shut off, there will often remain a persistent trickle of water through the pipe long after the supply has been shut off. Most often this lack of positive shut off is a result of a faulty valve, or simply the gradual evacuation or draining of water that is contained in the water system upstream of the repair site. The trickle of water often results in a defective joint that will have to be repaired, often under the same circumstances that resulted in the initial defect.

A number of disclosures have been made directed at temporary plugs for use in plumbing applications; many of these disclosures are directed at temporary plugs for blocking sewage pipe systems during initial integrity testing of the system during construction. Most of these disclosures are directed at frangible, rather than purely soluble plugs. For example, U.S. Pat. No. 6,267,001 is directed at a plug for testing a waste water line in which the plug includes a disk of material which remains structurally intact when dry and which loosens its structural integrity when wet. This disk of material is covered with a moisture barrier. It is necessary to mechanically break the plug or to physically rupture the moisture barrier in order to restore flow to the pipe. The disclosed plug is designed to be incorporated into the plumbing system at the time the system is constructed. Therefore, the plug cannot readily be added to the system for making repairs at a later time.

Similarly, U.S. Pat. No. 4,739,799 is also directed at a frangible plug for closing off a sewage line for testing the line for leaks. The disclosed plug is maintained in an annular groove in a sleeve that must be incorporated into the pipe system as it is constructed. The sleeve includes a device that may be operated from the exterior of the sleeve to break the frangible plug. Such a device may be a screw or bolt passing through the sleeve and bearing on an edge of the plug. As with the previous disclosure, the sleeve and the plug must be incorporated into the plumbing system at the time the system is constructed.

U.S. Pat. No. 4,357,960 discloses a plug formed from a mixture of alginate and bentonite. Bentonite is a clay product that swells when wet. Water soluble alginate is used as a binder for the bentonite. The bentonite and alginate may be mixed into a formable state and inserted into an end of a pipe to be repaired, for example by rolling the mixture into a sphere that is slightly larger than the inside diameter of the pipe. Repair of the pipe may then be carried out in the conventional manner. The plug will disintegrate and/or dissolve and will wash down the drain when the water supply to the pipe is turned on.

Similarly, U.S. Pat. No. 5,318,075 discloses a water soluble drip stop plug for stopping water flow in a pipe that is formed from polyethylene oxide which will dissolve after a predetermined time after water flow is restored to the pipe. The disclosed plug is cup-shaped having end and side wall thicknesses selected to provide a predetermined time for repair. Typically, the end wall is designed to dissolve prior to the side wall. The cup-shape of the plug is used because it reduces the volume of material that must be dissolved and purged from the pipe.

SUMMARY OF THE INVENTION

A plug for temporarily restraining the flow of water comprising a fibrous body configured to be received in a pipe, said fibrous body comprising water soluble fibers.

A method of temporarily retraining the flow of water in a pipe comprising providing water soluble fibers wherein said fibers will dissolve in water, providing a pipe where said pipe has a flow of water, shaping said fibers in the form of a plug to temporarily restrain the flow of water in said pipe until said fibers dissolve in said water, and placing said fibers into said pipe to temporarily restrain the flow of water.

A method for manufacturing a plug to temporarily restrict the flow of water in a pipe comprising identifying a flow of water to be restricted and identifying the rate of flow of said water and the temperature of said water and selecting a time for restricting the flow of said water. This is followed by the step of selecting a water soluble fiber for restricting said flow of water for said selected time wherein the water solubility of said fiber is adjusted to provide said selected time as a function of the water solubility of said fiber and the molecular weight of said fiber. This is followed by the step of shaping said fibers in the form of a plug and positioning said plug in said pipe to temporarily restrict the flow of water for said selected time.

BRIEF DESCRIPTION OF THE DRAWINGS

Advantages of the present invention will be apparent from the following detailed description of exemplary embodiments, which description should be should be considered in conjunction with the accompanying drawings, wherein.

DESCRIPTION OF THE PREFERRED EMBODIMENTS OF THE INVENTION

As noted, the present invention relates to a plug for use in a plumbing application to temporarily stem the flow of water in a pipe. The plug includes water soluble fiber structure, preferably poly(vinyl alcohol) polymer fiber. The plug may be constructed by carding and needle punching the water soluble fiber into a non-woven sheet. Individual plugs may then be cut from the sheet of non-woven fiber material. The plug may be sized to fit within a pipe in a sealing manner, thereby preventing the flow of water through the pipe. The working time of the plug may be adjusted by controlling the degree of hydrolysis of the polyvinyl alcohol fiber, the thickness of the plug, and the density of the fibrous body.

Consistent with the present invention, a temporary plug is provided for use during the repair or modification of a plumbing system. The plug according to the present invention allows any residual flow of water in a plumbing system to be stopped, or at least reduced sufficiently to allow the repair of the pipe to be carried out.

Figure 1:
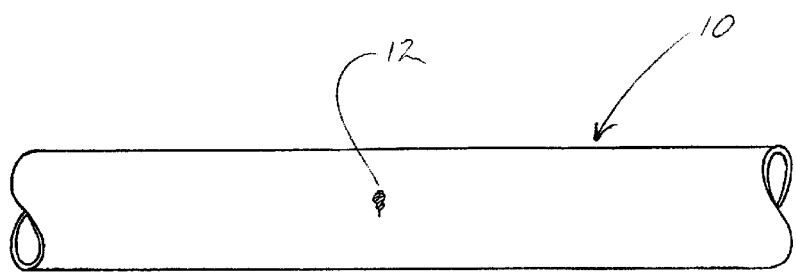
FIG. 1 illustrates an exemplary pipe having a defect to be repaired.
Figure 2:
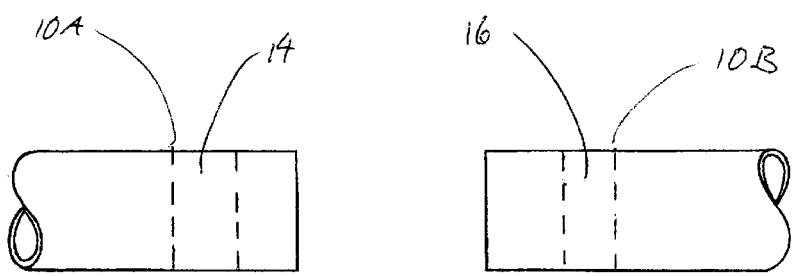
FIG. 2 illustrates the exemplary pipe of FIG. 1 with the defect portion removed.

Referring to FIG. 1, a pipe 10 is shown having a defect 12 therein. According to a conventional method of repairing a defect 12 in a pipe 10, any water supply in the pipe 10 is shut-off, generally removing any pressurized flow through the pipe 10. Next, the segment of the pipe adjacent to the defect 12 is removed, thereby dividing the pipe 10 into a first pipe segment 10A and a second pipe segment 10B, as shown in FIG. 2. Even with the water supply shut-off, often there may remain a small flow of water through the pipe 10. This may be the result of a faulty shut-off valve, or simply the slow evacuation of water from upstream in the plumbing system.

Referring to FIG. 2, a temporary plug 14, 16 (shown in broken lines) may be employed in the end of at least one of the first and the second pipe segments 10A, 10B. It should be understood that whether a temporary plug 14, 16 is employed in respective segments 10A and/or 10B depends on whether the respective segment is experiencing an outflow of water. Once the temporary plug 14, 16 is in place, and the flow of water has been controlled, the end of the pipe may be cleaned, dried and otherwise prepared as necessary.

Figure 3:
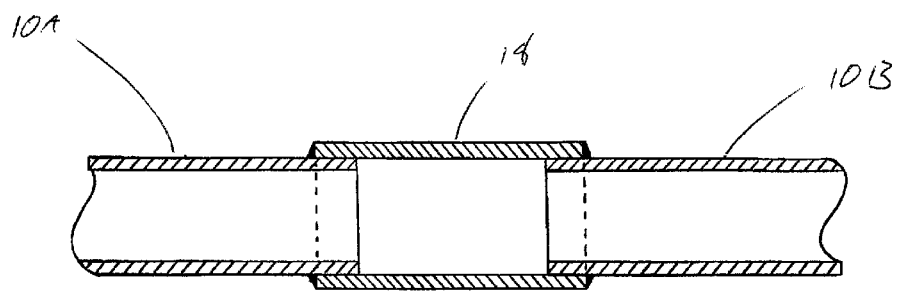
FIG. 3 illustrates the exemplary pipe of FIG. 1 with the repair complete.

Finally, as shown in FIG. 3, a fitting 18 may be provided joining the first pipe segment 10A and the second pipe segment 10B. The fitting 18 may be soldered or adhesively bonded in place using known techniques consistent with the type of pipe being repaired. After the repair has been completed, the water supply to the pipe 10 may be restored. The temporary plug 14, 16 are formed so that once the water supply is restored the temporary plug 14, 16 will rapidly dissolve and be flushed from the system.

A temporary plug consistent with the present invention preferably includes a fibrous body that may have a generally cylindrical or frusto-conical shape. The fibrous body is constructed by preferably employing such water soluble fiber, wherein the water soluble characteristics of the fiber are strategically controlled to provide the appropriate working time for effectuating pipe repair. As noted herein, such control of working time may be a function of the water soluble characteristics of the fiber, the density of the fiber, and the temperature and pressure of the water.

In such context, one exemplary and preferred water soluble fiber is poly(vinyl alcohol) polymer fiber, also known as "PVOH" fiber. Desirably, the plug may be constructed entirely of polyvinyl alcohol fiber. Alternatively, additional fiber and non-fiber materials, which are water insoluble, may also be incorporated into the plug. In that context it can be further appreciated that by strategically adjusting the relative concentration of water soluble to water insoluble fiber, another unique method of control of overall water solubility can be obtained herein.

A plug consistent with the present invention may be produced by preferably carding and needling poly(vinyl alcohol) polymer fiber to form a non-woven fibrous structure. Needling, or needle punching, in general locks fibers together forming a fibrous structure, such as a felt structure. Needle punching uses a set, or several sets of barbed needles, which are mechanically moved up and down through a batt of carded staple fiber. As the needles move through the batt, the barbs, located along the needle's length, capture individual staple fibers. Through mechanical needling action the fibers are intermingled with each other and simultaneously compacted. This process may be used to produce a uniform, compacted structure, in which fibers are packed against one another to minimize fiber pull out. The mechanical action of needle punching may be used to orient fibers in the X, Y, and Z-direction of the fabric. The Z-directional fibers may be used to lock several batts together to form structures that are not possible with single carded batting. In such context, it should be appreciated that the basis weight can vary herein between 10–300 ounces/yard$^2$, including all 1.0 ounce/yard$^2$ therebetween. In addition, preferably, the plugs of the present invention have a thickness of up to and including 3.0 inches, and preferably in the range of 0.5 to 3.0 inches, and all 0.1 inch increments therebetween.

The carding and needling process may provide a sheet of poly(vinyl alcohol) fiber. This carded and needled sheet may generally resemble a felted, or non-woven textile. Individual plugs may be cut from the needled sheet of polyvinyl alcohol fiber. The actual cutting process may include, for example, a die-cutting or similar process. Consistent with this manufacturing process, the resultant plugs may generally be circular plugs having a thickness generally equal to the thickness of the needled sheet stock.

While the above manufacturing method is consistent with the present invention, it should be understood that alternative methods and structures may be employed to produce suitable plugs constructed of poly(vinyl alcohol) fiber. For example woven or random mat structures, either with or without a binding agent, may be formed as the sheet stock from which the plugs may be cut.

Alternatively, poly(vinyl alcohol) fiber may be formed into suitable plugs by consolidating a quantity of fiber into a desired shape, for example a cylinder or truncated cone. The fiber may be consolidated through the use of a binder, including poly(vinyl alcohol) polymer resin as a binder. Alternatively, the poly(vinyl alcohol) fiber may be consolidated into a plug by heating the fiber to the tack point. That is, heating the fiber to the point where contacting fibers fuse together without losing the fiber structure. Tacking the fibers may be employed in conjunction with a binder. The resultant plug, according to either process, is a fibrous body primarily constructed of poly(vinyl alcohol), and therefore will be water soluble.

While the plug desirably stops, or at least reduces the flow of water enough that the pipe may be repaired, it is also preferable that the plug dissolve quickly after the repair has been accomplished, thereby restoring the plumbing system to a useable condition with a minimum of downtime. Therefore, there must be a balance between the working time necessary to accomplish the repair and the total downtime, i.e., the time from the installation of the plug until the plug is completely dissolved and flushed from the water system.

Two related factors that effect working time are permeation and dissolution. Permeation is the passage of water through the fiber matrix of the plug. This is largely related to how tightly packed, or how dense, the fibers of the plug are. Dissolution is the actual dissolving of the polyvinyl alcohol in the water. Dissolution is largely a function of the molecular weight and degree of hydrolysis of the poly(vinyl alcohol) polymer, as well as the temperature of the water and the flow rate of the water. It should be noted that as the water permeates the plug, the poly(vinyl alcohol) fibers may begin to dissolve, increasing the rate of permeation. As the rate of permeation increases, the increase water flow past the plug may result in an acceleration of dissolution.

Taking the above factors into account, construction of the plug may be varied to provide different predetermined working times. For example, the thickness of the plug may be increased to provide a longer working time by providing a longer path that the water must permeate, and a greater amount of material that must be dissolved to open the water passage. Similarly, a more tightly packed fiber structure may be use to decrease the rate of permeation and increase the working time.

In addition, it should be appreciated that the chemical characteristics of poly(vinyl alcohol) may also affect the solubility, as well as other properties of the plug. Therefore, the chemical characteristics of the poly(vinyl alcohol) polymer may also be altered to control the working time. The molecular weight of the poly(vinyl alcohol) may be increased to decrease the solubility of the polymer, and thereby increase the working time as well as high temperature usage (i.e., use in the presence of hot water). Similarly, the degree of hydrolysis of the poly(vinyl alcohol) may influence the water resistance of the polymer.

By degree of hydrolysis, it is reference to the relative concentration of hydroxyl functionality, in the poly(vinyl alcohol) polymer that contributes to the act of dissolution in water. Stated another way, poly(vinyl alcohol) is typically prepared from poly(vinyl acetate) polymer. Accordingly, poly(vinyl acetate) polymer is hydrolyzed, and one can therefore prepare 100% hydrolyzed poly(vinyl alcohol) in which all of the acetate groups are converted to alcohol groups. A degree of hydrolysis of 50% would therefore refer to conversion of 50% of the acetate groups to alcohol groups. Accordingly, in the broad context of the present invention the degree of hydrolysis may be varied, from 10%–100%, and at all 1.0% increments therebetween.

In that regard, while poly(vinyl alcohol) is soluble in water, high degrees of hydrolysis (and high relative concentration of hydroxyl groups in the chain relative to the acetate groups from which they are derived) also creates intermolecular attraction between the polymer chains, thereby leading to the need of heated water to effect dissolution. Alternatively, at lower degrees of hydrolysis, and lower levels of intermolecular attraction, water at room temperature, or even cold water, will effect dissolution. Accordingly, plugs can be prepared herein which have different and varying degrees of hydrolysis of the PVOH fiber, and which therefore have different dissolution characteristics as may be required for a given application to attenuate water flow to effectuate a plumbing repair.

Consistent with the above, and describing the above in different context, it is noted that fully hydrolyzed poly(vinyl alcohol) may, therefore, be used to provide a longer working time over partially hydrolyzed poly(vinyl alcohol). Additionally, fully hydrolyzed poly(vinyl alcohol) has a significantly lower solubility in heated water, and may be more suitable for use with hot water applications. The poly(vinyl alcohol) fiber plugs may therefore be constructed to provide a broad range of predetermined working times. Additionally, fiber plugs may be constructed to provide advantageous performance under varying conditions, such as water temperature, water flow rate, etc.

It should be apparent to those having skill in the art that the invention herein is susceptible to modification beyond the discussed embodiments without departing from the spirit and scope of the invention laid out in the claims.

What is claimed is:

1. A plug for temporarily restraining the flow of water comprising:

a fibrous body configured to be received in a pipe, said fibrous body comprising poly(vinyl alcohol) water soluble fibers.

2. A plug according to claim 1 wherein said poly(vinyl alcohol) polymer has a degree of hydrolysis of equal to or greater than 50%.

3. A plug of claim 1 wherein said fibrous body further includes non-water soluble fibers.

4. A plug according to claim 1 where in said fibrous body comprises a carded and needled structure of water soluble fibers.

5. A plug according to claim 1 wherein said fibrous body comprises at least partially fused water soluble fibers.

6. A plug according to claim 1 wherein said fibrous body comprises water soluble fibers and a binder.

7. The plug according to claim 1 wherein said fibrous body is comprised of carded and needled water soluble fibers at a basis weight of 10–300 oz./yard$^2$.

8. The plug according to claim 1 wherein said plug has a thickness up to about 3.0 inches.

9. A method of temporarily restraining the flow of water in pipe comprising;

providing poly(vinyl alcohol) water soluble fibers wherein said fibers will dissolve in water;

providing a pipe where said pipe has a flow of water;

shaping said fibers in the form of a plug to temporarily restrain the flow of water in said pipe until said fibers dissolve in said water;

placing said fibers into said pipe to temporarily restrain the flow of water.

10. The method of claim 9 wherein said fibers comprise poly(vinyl alcohol) fibers that have a degree of hydrolysis of equal to or greater than 50%.

11. The method of claim 9 wherein said fibers comprise poly(vinyl alcohol) fibers that have a degree of hydrolysis of equal to or greater than 80%.

12. The method of claim 9 wherein said step of shaping said fibers in the form of a plug includes needle punching said fibers and cutting into the form of a plug.

13. The method of claim 9 wherein shaping said water soluble fiber comprises combining a binder to said water soluble fiber and setting said binder.

14. The method of claim 13 wherein setting said binder comprises thermally setting said binder.

15. The method of claim 9, wherein said shaping of said fibers comprises heating said water soluble fiber to at least a tack point of said water soluble fiber.

16. A method for manufacturing a plug to temporarily restrict the flow of water in a pipe comprising:

(a) identifying a flow of water to be restricted;
(b) identifying the rate of flow of said water and the temperature of said water and selecting a time for restricting the flow of said water;
(c) selecting a water soluble fiber for restricting said flow of water for said selected time wherein the water solubility of said fiber is adjusted to provide said selected time as a function of the water solubility of said fiber and the molecular weight of said fiber;

(e) shaping said fibers in the form of a plug and positioning said plug in said pipe to temporarily restrict the flow of water for said selected time.

17. The method of claim 16 wherein said fibers comprise poly(vinyl alcohol) polymer.

18. The method of claim 16 wherein said shaping said fibers included needle punching said fibers and forming a plug.

* * * * *